United States Patent [19]
Suzuki et al.

[11] Patent Number: 5,203,901
[45] Date of Patent: Apr. 20, 1993

[54] METHOD FOR CONVERTING WASTE TO CRYSTALLIZED GLASS

[75] Inventors: Shigeru Suzuki; Keiichiro Miyano; Takumi Kaneko; Yoshikazu Nagayoshi, all of Tokyo, Japan

[73] Assignees: Tsukishima Kikai Co., Ltd.; Tokyo Metropolitan Government, Japan

[21] Appl. No.: 809,883

[22] Filed: Dec. 18, 1991

[30] Foreign Application Priority Data

Dec. 25, 1990 [JP] Japan .................................. 2-413772

[51] Int. Cl.$^5$ .............................................. C03C 10/00
[52] U.S. Cl. .......................................... 65/33; 65/134; 501/69; 501/155
[58] Field of Search ........................... 65/33, 134–136; 501/155, 69

[56] References Cited

U.S. PATENT DOCUMENTS

| | | | |
|---|---|---|---|
| 1,192,709 | 7/1916 | Tone | 65/33 |
| 3,942,966 | 3/1976 | Krøyer et al. | 65/33 |
| 4,042,362 | 8/1977 | MacDowell et al. | 65/33 |
| 4,191,546 | 3/1980 | Krøyer | 65/22 |

FOREIGN PATENT DOCUMENTS

244358 12/1925 United Kingdom .................. 65/134

OTHER PUBLICATIONS

European Search Report, dated 01 Apr. 1992, Appln. No. EP 91 40 3473.
Chemical Abstracts, vol. 110, No. 10, 15 May 1989, Columbus, Ohio, US, Abstract No. 178049A, L. G. Dashchinskii et al., Mineral formation in slag glasses of wollastonite composition p. 306.
Chemical Abstracts, vol. 94, No. 24, Jun. 1981, Columbus, Ohio US, Abstract No. 196469T, slag glass ceramics, p. 277 col. 2.
SU-A-772 980 (all Union Scientific Research Inst. of Construction Mat. and Products, 23 Oct. 1980).
Chemical Abstracts, vol. 106, No. 18, May 1987, Columbus, Ohio US; Abstract No. 142775N, p. 284; column 2; PL-A-128 842 (Instytut Szkla I Ceamiki) 31 Jan. 1986.
Chemical Abstracts, vol. 107, No. 4, Jul. 1987, Columbus, Ohio US; Abstract No. 27332Z, p. 251; col. 1; CN-A-85 100 521 (Chen, Pinzhen et al.) 13 Aug. 1986.
Transactions and Journal of the British Ceramic Society, vol. 76, No. 4, 1977, Stoke-On-Trent GM pp. 82–94; Carruthers et al. Preparation of glass . . . , p. 84, para 3.4–4; table 1.

*Primary Examiner*—Robert L. Lindsay
*Attorney, Agent, or Firm*—Thompson, Hine and Flory

[57] ABSTRACT

A processing method is presented for treating sludges from municipal and waste materials. The ashes from such sludges, containing $SiO_2$ as a primary constituent, are treated with additives to tailor the feed material composition. Thermal processing, including melting, rapid cooling and subsequent annealing, produces a crystallized glass microstructure in which needle-shaped shaped crystals of anorthite and $\beta$-wollastnite are infiltrated with a vitreous material. Such crystallized glasses having superior mechanical and aesthetic properties are an attractive architectural material which can be utilized for interior finishing, exterior walls, flooring as well as for interior decorations.

13 Claims, 2 Drawing Sheets

METHOD FOR CONVERTING WASTE TO CRYSTALLIZED GLASS

BACKGROUND OF THE INVENTION

1. Field of the Invention

The present invention relates to a process for converting ashes from the industrial and municipal wastes, such as sludges and the like, to crystallized glass.

2. Background Art

Heretofore, most waste materials, including industrial and municipal sludges have been buried in landfill or otherwise disposed of. The problems associated with the conventional method of disposal have become obvious lately, because of the difficulties in securing the landfill sites, as well as the destruction of environments, including the emission of offensive odors and the like. Recently, such waste material has been subjected to incineration treatment in order to reduce the quantity of the waste and to stabilize the waste. Lately, subsequently disposal of the incinerated ashes has also become difficult, because such disposal often resulted in a secondary environmental problem such as leaching of heavy metals and the like into the ground. Therefore, attempts have been made to utilize sludges by converting them to slags by melting.

Conventional methods for manufacturing a structural aggregate materials comprise the steps of: (1) combusting the waste at high temperatures to perform ashing and melting simultaneously; or combusting the waste to form an ash and then to melt the ash at high temperatures; and (2) cooling the melted ash to form a slag. The cooling methods may be roughly divided into two types: one is a water-granulation method in which the melted slag is rapid-cooled by dropping the slag into water to obtain small glassy globules. Another is an annealing method for manufacturing large crystallized slag by annealing the melted slag held in a metal mold.

In addition, a method for manufacturing crystallized slag is proposed, for example in Japanese Patent Application Second Publication No. 1-24739, which comprises the steps of: (1) preparing a mixture of incinerated ash and other materials so as to have a ratio of $(CaO+MgO)/SiO_2$ of 0.8 to 1.2; (2) melting the mixture at 1350° C. to 1500° C.; (3) crushing the melted mixture by rapid cooling thermal shock; and (4) maintaining the crushed mixture at 1000° C. to 1200° C. for 30 minutes.

Furthermore, another method for manufacturing crystallized slag is proposed, for example in Japanese Patent Application Second Publication No. 61-24074, which comprises the steps of: (1) preparing a mixture of incinerated ash and other materials so as to have a ratio of $(CaO+MgO)/SiO_2$ of 0.8 to 1.2; (2) melting the mixture at 1350° C. to 1500° C.; (3) molding the melted mixture in a mold maintained at 300° C. to 600° C.; and (4) maintaining the molded mixture at 1020° C. to 1180° C. for 30 minutes or more.

The water granulation method described above has a disadvantage that the impact strength of the aggregates is low due to its glassy structure. In addition, in the annealing method described above, since the type of crystals to be precipitated is not controlled, the product thus produced has low bending and impact strengths and it cannot be used as produced. For this reason, all the crystallized slag materials have been used as aggregate materials for such applications as crushed road bed materials.

Furthermore, the conventional method for processing slags described above needs a large amount of additives such as calcium when the incineration ash is from municipal wastes or from the dehydrated polymer flocculant which constitutes the main ingredient of such sludges. The processing steps were also slanted towards producing aggregate materials.

SUMMARY OF THE INVENTION

In view of the above mentioned difficulties in producing useful industrial products by the conventional processing of waste material sludges, it is an object of the present invention to provide a method for converting such waste materials to a crystallized glass of a sufficiently high quality to be useful as a high-grade building material for use in architectural applications for interior finishing, exterior walls, flooring as well as for interior decorations.

Accordingly, a processing method is presented for utilizing incineration ashes from waste material sludges using a reduced amount of additives, not for the purpose of producing aggregate materials but to produce crystallized glasses of superior mechanical and aesthetic properties.

One aspect of the present invention is directed to providing a method for manufacturing crystallized glass comprising the steps of:

(a) preparing a feed material including at least one of waste and incineration ashes, so as to have a feed material of a composition: 35% to 55% by weight of $SiO_2$; 5% to 20% by weight of $Al_2O_3$; 2% to 15% by weight of $Fe_2O_3$; 5% to 30% by weight of CaO; 0.2% to 5% by weight of carbon (C); and 0.2% to 6% by weight of sulfur (S), in which the ratio of $CaO/(SiO_2+Al_2O_3)$ is in a range of 0.15 to 0.7;

(b) melting the feed material at 1300° C. to 1500° C. to form a melted material;

(c) cooling the melted material to form a glassy material; and (d) subjecting the glassy material to heat treatment to form a crystallized glass, containing at least one of anorthite and β-wollastnite phases which is infiltrated with a vitreous material.

The objectives, effects, features, and the advantages of the present invention will become more apparent from the following descriptions of preferred embodiments thereof.

DETAILED DESCRIPTION OF THE INVENTION

Figure 1:
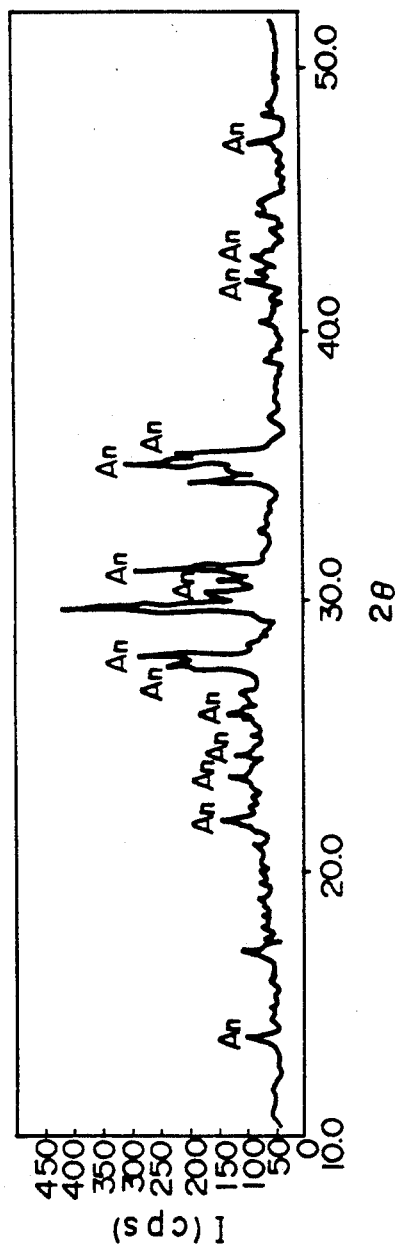
FIG. 1 is a X-ray diffraction chart of a crystallized glass obtained in an embodiment according to the present invention.
Figure 2:
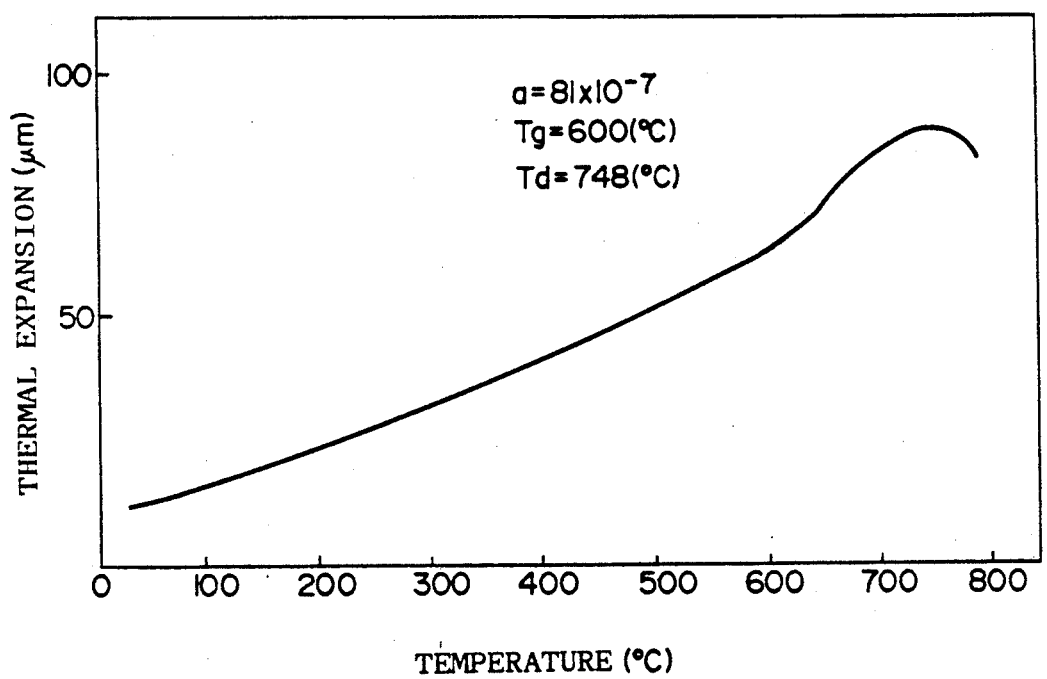
FIG. 2 is an embodiment of the thermal expansion test results on the base glass from which crystallized glasses are obtained.

According to the present invention, a method for manufacturing crystallized glass is provided which comprises the steps of:

(a) preparing a feed material including at least one of waste and incineration ashes, so as to have a feed material of a composition: 35% to 55% by weight of $SiO_2$; 5% to 20% by weight of $Al_2O_3$; 2% to 15% by weight of $Fe_2O_3$; 5% to 30% by weight of CaO; 0.2% to 5% by weight of carbon (C); and 0.2% to 6% by weight of sulfur (S), in which the ratio of $CaO/(SiO_2+Al_2O_3)$ is in a range of 0.15 to 0.7;

(b) melting the feed material at 1300° C. to 1500° C. to form a melted material;

(c) degassing the melted material as much as possible at 1200° C. to 1400° C. to form a degassed material;

(d) cooling the degassed material to form a vitreous material; and (e) subjecting the vitreous material to heat treatment to form a crystallized glass containing at least one of anorthite and β-wollastnite phases. It is preferable to maintain the vitreous material a 800 ° C. to 900° C. for longer than 15 minutes, for example, to precipitate a colloidal crystal such as FeS, and successively maintaining the colloidal crystal at 1000° C. to 1200° C. for at least 15 minutes to precipitate needle shaped crystals including anorthite $(CaO.Al_2O_3.2SiO_2)$ or β-wollastnite $(CaO.SiO_2)$ using the above described colloidal crystal as nucleus, thus obtaining a crystallized glass infiltrated with 40% to 60% of a vitreous constituent.

The feed material according to the present invention is derived from waste materials such as sludges or municipal wastes, or incinerated ashes from the wastes or other combustibles. These ashes comprise mainly $SiO_2$, $Al_2O_3$, $CaO$, $MgO$, $Fe_2O_3$, $P_2O_5$, $Na_2O$, $K_2O$, and the like, similar to the ashes produced from the sludge cakes precipitated with the aid of polymer flocculants. One such typical example is shown in Table 1. The melt properties of an ash of such a composition, such as its melting temperature or the flow temperature, depend on the composition ratio of the ash. For example, if the ratio of CaO/SiO is in the range of 0.8 to 1.2, the melted material can flow out from the furnace at temperatures 1400° C. or less.

TABLE 1

| Ingredients, % by weight | |
|---|---|
| $SiO_2$ | 40.72 |
| $Al_2O_3$ | 14.80 |
| CaO | 8.24 |
| MgO | 2.97 |
| $Fe_2O_3$ | 9.56 |
| $P_2O_5$ | 12.97 |
| $Na_2O$ | 1.25 |
| $K_2O$ | 1.44 |
| others | 8.05 |

Heretofore, it has been believed that setting the ratio of CaO/SiO in the range of 0.8 to 1.2 is crucial to crystallize the melted material of such waste or incinerated ash. Various studies by the present inventors showed that needle-shaped crystals such as anorthite $(CaO.Al_2O_3.2SiO_2)$ or β-wollastnite $(CaO SiO_2)$ can be precipitated by carrying out the successive steps of:

(a) preparing a feed material including at least one of waste and incineration ashes, so as to have a feed material of a composition: 35% by weight to 55% by weight of $SiO_2$; 5% by weight to 20% by weight of $Al_2O_3$; 2% by weight to 15% by weight of $Fe_2O_3$; 5% by weight to 30% by weight of CaO; 0.2% by weight to 5% by weight of carbon (C); and 0.2% by weight to 6% by weight of sulfur (S), and the feed material having a ratio of $CaO/(SiO_2+Al_2O_3)$ in a range of 0.15 to 0.7;

(b) melting the feed material at 1300° C. to 1500° C. to form a melted material;

(c) degassing the melted material as much as possible at 1200° C. to 1400° C. to form a degassed material;

(d) cooling the degassed material to form a vitreous material; and (e) subjecting the vitreous material to heat treatment to form a crystallized glass including at least one of anorthite and β-wollastnite phases.

It is preferable to maintain the vitreous material at 800° C. to 900° C. for at least 15 minutes, for example, to precipitate a colloidal crystal such as FeS, and to subsequently maintain the colloidal crystal at 1000° C. to 1200° C. for at least 15 minutes to precipitate the desired needle-shaped crystals such as anorthite $(CaO.Al_2O_3.2SiO_2)$ or β-wollastnite $(CaO.SiO_2)$.

In addition, in order to obtain a crystallized glass having superior mechanical, thermal, and chemical properties, acceptable for use as a high-grade building material, the crystallization process should begin not from the surface regions but from within the melt and progress uniformly throughout the melt. It is known that a nucleating agent aids the crystallization process. In order to precipitate crystals such as anorhrite or β-wollastnite, sulfur compounds such as FeS or ZnS are suitable as nucleating agents. However the iron or sulfur component in the feed material is usually present in the form of oxides such as $Fe_2O_3$, $Na_2SO_4$, or the like. Since the desirable FeS or ZnS cannot be obtained simply by melting the waste or the ash content, the carbon (C) component which is present in the feed material can function as a reducing agent to reduce the abundances of oxides such as $Fe_2O_3$, $Na_2SO_4$ and the like described above. For this reason, the desired FeS can be produced from $Fe_{3+}$ or $Fe_{2+}$ obtained in the reduction reaction described above.

The feed material including at least one of waste and incineration ashes, having the above-described composition, is melted at 1300° C. to 1500° C. to form a melted material. The melted material is degassed as much as possible at 1200° C. to 1400° C. to form a degassed material. The degassed material is poured into a cast-iron mold while the viscosity of the material is maintained at a temperature between 1200° C. to 1300° C. to enable the degassed material to flow from the opening of the furnace. The cast material in the mold is cooled to form a vitreous material. The vitreous material is heat treated in a heat-treatment furnace, preferably at 800° C. to 900° C. for 15 minutes or longer to form a colloidal crystal, and the material is subsequently heat treated at 1000° C. to 1200° C. for 15 minutes or more, preferably 30 wollastnite having the colloidal crystals as a nucleating agent.

The reason for setting the range of $SiO_2$ between 35 to 55% by weight is that at concentrations less than 35% by weight, the amount is insufficient to form the structure of the crystallized glass including anorthite or β-wollastnite. If the amount of $SiO_2$ is more than 55% by weight, the quality of the heat-treated crystallized glass deteriorates because the molten material does not flow out from the furnace readily due to the increased viscosity of the molten charge.

In addition, if the amount of $Al_2O_3$ is less than 5% by weight, a large amount of additives must be added. If the amount of $Al_2O_3$ is more than 20% by weight, the precipitation of the crystals other than anorthite and β-wollastnite is increased, leading to the deterioration the mechanical properties of the resulting product.

If the amount of CaO is outside the range of 5% to 30% by weight, the precipitation of the crystals other than anorthite and β-wollastnite is increased. Furthermore, if the amount of CaO is more than 30% by weight, the amount of additives needed, such as lime, calcium carbonate, or the like is proportionally increased.

If the amount of $Fe_2O_3$, although serving an important function as a flux or a nucleating agent, exceeds 15% by weight, it has an adverse effects on crystallization. If the amount of $Fe_2O_3$ is less than 2% by weight, the fluxing effect is reduced, and for this reason, other additives are added or their quantity has to be increased.

The reason for adopting the carbon concentration of 0.2 to 5% is that there is little reduction action at concentrations below 0.2% while there is no additional benefit gained by using concentrations above 5%.

The reason for adopting the sulphur concentration of 0.2 to 6% is that 0.2% is insufficient to provide the needed amount of nucleating agent, including evaporative losses, while over 6% is excessive.

The reason for making the ratio of $CaO/(SiO_2+Al_2O_3)$ between 0.15 to 0.7 is to precipitate out the crystals of anorthite and $\beta$-wollastnite and to leave about 40 to 60% of the vitreous material as a matrix.

The reason for setting the melting temperatures of the feed materials to be 1300 to 1500° C. is that at temperatures below 1300° C., it becomes difficult to completely melt the feed material, leading to high viscosity, poor fluidity, and premature precipitation of crystallized materials, thus leading to difficulties in producing vitreous materials. At temperatures above 1500° C., erosion of furnace linings becomes a problem as well as increased radiative losses, thus leading to an uneconomic process.

The reason for performing degassing at temperatures between 1200 and 1400° C. is that at 1200° C., the viscosity of the melt becomes too high for good fluidity while over 1400° C. is uneconomic because of the excessive heating required.

Further, the reason for setting the temperature for colloidal crystals formation at 800 to 900° C. is that these crystals form at temperatures between the transition temperature and the melting temperature, but at temperatures below 800° C., there is little growth of Fe-containing crystals while at temperatures over 900° C., other crystals begin to precipitate, and therefore the FeS colloidal crystals are not being used effectively as a nucleating agent. The annealing conditions are set at temperature of 1000 to 1200° C. for 15 minutes or more, because at temperatures below 1000° C., the growth of anorthite and $\beta$-wollastnite is insufficient while above 1200° C. the growth process becomes unstable because of remelting of parts of precipitated crystals and other undesirable effects. The time at temperature is set at 15 minutes, because the crystallization process is incomplete when the holding time is shorter.

The glass crystals thus produced have high strength and are stable against chemicals, because the needle-shaped crystals of anorthite and $\beta$-wollastnite are infiltrated with vitreous materials. The crystallized glass material can be melted and poured into a mold to produce a shape, and after stress relieving heat treatment, it can be ground and polished to produce a translucent article of a high product value.

PREFERRED EMBODIMENTS OF THE PRESENT INVENTION

The waste ashes obtained from the sewage treatment plants were converted to feed materials having the compositions shown in Table 2 below.

They were held at their respective melting temperatures, between 1300 to 1500° C., for four hours. This treatment was followed further by degassing at 1200 to 1400° C., and the molten material was poured into a steel container or into water to produce small glass globules. They were placed in a heat treating furnace, and heated to around 800 to 900° C., and after holding for a given period of time, the temperature was raised to 1000 to 1200° C. for further annealing treatment for a fixed time period. The results are summarized in Table 3 (Processing Conditions) and Table 4 (Properties) for the various compositions 1 to 12.

Comparative test examples 13 to 15 were produced from the feed materials blended t outside the compositions of the present invention. They were processed under the same processing conditions of melting, degassing, rapid cooling and annealing treatment as the foregoing twelve embodiment samples. The results from the comparative test samples are also shown in Tables 2, 3 and 4. The results of X-ray diffraction analyses are shown in FIG. 1, which demonstrated that for the compositions 1 to 8, anorthite crystals were present, and for the compositions 9 to 12, the presence of $\beta$-wollastnite crystals was confirmed. Thermal expansion tests were performed on the base glass, and as a representative example, the results of measurements from embodiment No. 5 are shown in Table 2. The coefficient of expansion a was $81 \times 10^{-7}$ which is lower than that for ordinary glasses. The transition temperature and the softening temperature were also higher than those for ordinary glasses by about 100° C. These are good indications of a glass material having high thermal stability. Table 4 shows the results of testing of the produced samples for their strength, hardness (Moh's hardness), acid resistance and alkaline resistance.

Three point bending tests were performed on specimens of $100 \times 100 \times 8$ mm (length$\times$width$\times$thickness), by placing a specimen on two rods of 10 mm diameter, and applying the load through a rod of the same diameter placed at the top midpoint of the specimen. The acid resistance tests were performed with an aqueous solution containing 1% sulfuric acid, and the alkaline resistance tests were performed with an aqueous solution containing 1% sodium hydroxide. A sample measuring $15 \times 15 \times 10$ mm size were immersed in respective solutions for 650 hours at 25° C.

The tests results for the comparative samples ar also shown in Table 4 to demonstrate the superiority of the test samples. For example, the results confirmed that the test samples (1-12) were superior to the comparative samples (13-15) or to natural rock (16) in their mechanical strength, impact and chemical stability.

TABLE 2

A Summary Table Of Compositions Of Embodiments And Comparative Samples

| Test No. | Composition, % by weight | | | | | | A |
|---|---|---|---|---|---|---|---|
| | $SiO_2$ | $Al_2O_3$ | $Fe_2O_3$ | CaO | C | S | |
| 1 | 39.3 | 15.3 | 7.0 | 21.6 | 1.0 | 2.0 | 0.40 |
| 2 | 45.3 | 10.8 | 5.0 | 21.9 | 0.2 | 0.2 | 0.39 |
| 3 | 35.0 | 19.8 | 6.4 | 28.0 | 5.0 | 5.0 | 0.51 |
| 4 | 52.7 | 11.2 | 2.4 | 25.3 | 3.0 | 3.0 | 0.40 |
| 5 | 42.9 | 12.7 | 2.9 | 8.5 | 2.9 | 5.1 | 0.15 |
| 6 | 43.2 | 11.8 | 10.1 | 20.3 | 5.0 | 3.2 | 0.37 |
| 7 | 39.5 | 10.8 | 5.0 | 21.8 | 0.5 | 0.9 | 0.43 |
| 8 | 44.9 | 12.3 | 8.8 | 15.0 | 4.0 | 4.5 | 0.26 |
| 9 | 46.6 | 5.1 | 5.9 | 14.3 | 1.0 | 3.2 | 0.28 |
| 10 | 40.4 | 8.7 | 5.1 | 22.4 | 4.5 | 4.5 | 0.46 |
| 11 | 48.2 | 6.5 | 4.1 | 26.9 | 0.8 | 3.2 | 0.49 |
| 12 | 39.5 | 8.5 | 3.1 | 18.5 | 3.3 | 2.5 | 0.39 |
| 13 | 40.7 | 14.8 | 9.6 | 8.2 | — | — | 0.15 |
| 14 | 35.6 | 9.7 | 3.0 | 35.5 | 5.0 | 3.0 | 0.78 |

TABLE 2-continued

A Summary Table Of Compositions Of
Embodiments And Comparative Samples

| Test No. | Composition, % by weight | | | | | | |
|---|---|---|---|---|---|---|---|
| | $SiO_2$ | $Al_2O_3$ | $Fe_2O_3$ | CaO | C | S | A |
| 15 | 40.1 | 15.6 | 7.2 | 3.4 | 4.0 | 2.5 | 0.06 |

Note:
A: $CaO/(SiO + Al_2O_3)$

TABLE 3

A Summary Table Of Heat Treating Conditions

| | | Heat Treatment Conditions | | | |
|---|---|---|---|---|---|
| Test No. | Melting Temp °C. | Primary | | Secondary | |
| | | °C. | Time | °C. | Time |
| 1 | 1450 | 800 | 1 hr | 1100 | 2 hr |
| 2 | 1500 | 900 | 15 min | 1000 | 4 hr |
| 3 | 1400 | 850 | 20 min | 1050 | 15 min |
| 4 | 1450 | 850 | 1 hr | 1050 | 1 hr |
| 5 | 1400 | 900 | 30 min | 1000 | 3 hr |
| 6 | 1450 | 800 | 2 hr | 1050 | 20 min |
| 7 | 1500 | 900 | 2 hr | 1000 | 30 min |
| 8 | 1450 | 850 | 1 hr | 1200 | 1 hr |
| 9 | 1400 | 800 | 30 min | 1050 | 2 hr |
| 10 | 1450 | 850 | 1 hr | 1000 | 4 hr |
| 11 | 1450 | 900 | 2 hr | 1050 | 1 hr |
| 12 | 1500 | 800 | 1 hr | 1100 | 2 hr |
| 13 | 1450 | — | — | 1050 | 4 hr |
| 14 | 1450 | 850 | 2 | 1050 | 1 |
| 15 | 1400 | 900 | 1 | 1200 | 3 hr |

TABLE 4

A Summary Comparison Of Properties Of Glasses
In Embodiments And Comparison Tests

| Test No. | Precip. | | Properties Comparison | | | |
|---|---|---|---|---|---|---|
| | An | Wol | Bend ($Kg/cm^2$) | Moh's Hard. | Acid (%) | Alkal (%) |
| 1 | O | | 550 | 6.0 | 0.10 | 0.05 |
| 2 | O | | 700 | 6.5 | 0.08 | 0.05 |
| 3 | O | | 400 | 4.8 | 0.15 | 0.08 |
| 4 | O | | 480 | 5.3 | 0.60 | 0.09 |
| 5 | O | | 600 | 6.2 | 0.07 | 0.06 |
| 6 | O | | 450 | 5.5 | 0.13 | 0.10 |
| 7 | O | | 470 | 5.7 | 0.11 | 0.09 |
| 8 | O | | 520 | 5.9 | 0.10 | 0.08 |
| 9 | | O | 650 | 6.7 | 0.08 | 0.09 |
| 10 | | O | 750 | 7.0 | 0.05 | 0.06 |
| 11 | | O | 640 | 6.3 | 0.09 | 0.07 |
| 12 | | O | 730 | 6.8 | 0.07 | 0.05 |
| 13 | X | X | 30 | 0.8 | 1.00 | 0.10 |
| 14 | X | X | 45 | 1.2 | 0.80 | 1.10 |
| 15 | X | X | 40 | 0.5 | 2.00 | 1.80 |
| 16 | Marble | | 180 | 4.5 | 10.10 | 0.25 |

Note:
An: anorthite
Wol: β-wollastnite
O: crystals present
X: crystals not present

What is claimed is:

1. A process for converting a waste material ash of a specific composition into a crystallized glass containing at least one phase of anorthite and β-wollastnite crystal phases, said process comprising the steps of:
   (a) preparing said waste material to produce a feed material, including a step of mixing with additives to provide said specific composition;
   (b) melting said feed material in a furnace to produce a melt at temperatures between 1300 to 1500° C.;
   (c) cooling said melt rapidly to produce a glassy charge; and
   (d) heat treating said glassy charge to produce a crystallized glass containing at least one phase of anorthite and β-wollastnite phases infiltrated with a vitreous material.

2. The process as claimed in claim 1, wherein said specific composition of the waste material comprises: 35 to 55% by weight of $SiO_2$; 5 to 20% by weight of $Al_2O_3$; 2 to 15% by weight of $Fe_2O_3$; 5 to 30% by weight of CaO; 0.2 to 5% by weight of C; 0.2 to 6% by weight of S, wherein the ratio of CaO to the sum of $SiO_2$ and $Al_2O_3$ is between 0.15 to 0.7

3. The process as claimed in claim 1, wherein said additives are selected from the group consisting of $CaCO_3$, sand and carbon compounds of and sulphur compounds of a substance selected from the group consisting of aluminum, iron, silicon, and calcium.

4. The process as claimed in claim 2, wherein said waste material is selected from the group consisting of industrial and municipal slurry wastes, dried wastes and incinerated ashes.

5. The process of claim 1 wherein said glass contains anorthite.

6. The process of claim 1 wherein said glass contains β-wollastnite.

7. The process of claim 1 wherein the step of heat treating includes maintaining the vitreous material at 800° C. to 900° C. for longer than 15 minutes to precipitate a colloidal crystal, and successively maintaining the colloidal crystal at 1000° C. to 1200° C. for at least 15 minutes to precipitate said anorthite or β-wollastnite crystal phases.

8. The process of claim 7 wherein the colloidal crystal is FeS.

9. The process of claim 1, wherein said specific composition of waste material comprises: 40.72% by weight of $SiO_2$; 14.80% by weight of $Al_2O_3$; 8.24% by weight of CaO; 2.97% by weight of MgO; 9.56% by weight of $Fe_2O_3$; 12.97% by weight of $P_2O_5$; 1.25% by weight of $Na_2O$; 1.44% by weight of $K_2O$; and 8.05% by weight of other ingredients.

10. The process of claim 1 wherein the ratio of $CaO_2$ to SiO is in the range of 0.8 to 1.2.

11. The process of claim 1 wherein said crystallization begins from within said melt and progresses uniformly throughout said melt.

12. A process of claim 1 further including the step of degassing the melted material at 1200° C. to 1400° C. to form a degassed material.

13. The process of claim 7 wherein said colloidal crystal is heat treated for 30 minutes.

* * * * *